UNITED STATES PATENT OFFICE.

PAUL R. WELCH, OF WESTFIELD, NEW YORK, ASSIGNOR TO THE WELCH GRAPE JUICE COMPANY, OF WESTFIELD, NEW YORK, A CORPORATION OF NEW YORK.

FOOD PRODUCT.

1,277,672.            Specification of Letters Patent.       Patented Sept. 3, 1918.

No Drawing.        Application filed October 4, 1917. Serial No. 194,645.

*To all whom it may concern:*

Be it known that I, PAUL R. WELCH, a citizen of the United States, and resident of Westfield, in the county of Chautauqua, in the State of New York, have invented new and useful Improvements in Food Products, of which the following is a full, clear, and exact description.

This invention relates to a new and useful method of manufacturing food products from fruits and vegetables, such as fruit jams, fruit marmalades, fruit butters, fruit pastes, vegetable pastes, catsups, etc., and to the products of such method, with specific application to the manufacture of food products of which grape material forms the base. The primary object of the invention is the utilization of the pomace or pulp from which the juice has been partially or wholly extracted in the manufacture of other products.

Other objects and advantages will appear from the following description in which the method is described as specifically applied to grapes.

The method as preferably carried out comprises the following steps:

1st. The stemmed or unstemmed grapes, either heated or unheated, are fed into a continuous pulping machine by means of which the grape juice and grape pulp are separated from the seeds and the stems, (if unstemmed grapes are used.)

The stems contain a material and valuable amount of potash and may be readily separated from the seeds by any suitable method, as a fanning or blowing process, which also separates any skins that may be discharged with the seeds.

Portions of the grape skins remain with the seeds and another portion is separated with the pulp and juice, the relative distribution depending largely upon whether the grapes are heated or unheated, and if heated the extent to which the heating or cooking has been carried.

If unheated, the skins largely remain with the seeds. If heated, a larger percentage of the grape skins is embodied with the pulp and juice.

2nd. The pulp and juice may then be sterilized or otherwise preserved and stored in containers which may be glass, stone jugs, barrels and the like.

I do not desire to limit myself to the sterilization or the preservation of the pulp and juice as essential to the invention, or as accomplished in any particular manner when effected in the preferable manner of carrying out the method herein, as such step may be omitted, the grape juice and pulp being stored as it comes from the pulping machine, or processed and separated immediately if desired.

3rd. The pulp and juice are allowed to stand for a period of several months, which period may be shortened by cold treatment, during which period the argol or bitartrate will form in definite crystals throughout the entire pulpy mass, such crystals, as shown in my experiments, being of material size and somewhat flaky form.

4th. These crystals including the argol heretofore lost in the pomace may be recovered in any suitable manner, as by a screening machine, such as a sugar type centrifugal equipped with proper size mesh screen, the pulp and juice being thrown out and the argol crystals retained within the screen.

5th. The grape juice and pulp may then be subjected to pressure in a filter press which will deliver the clear juice for bottling and discharge the pulp in a cake containing a minimum amount of moisture, the moisture content being less than that contained in the pomace cake produced in the present process.

However, the pomace cake under ordinary conditions will contain at least 50% of moisture, which is about as dry as anything of this nature can be pressed or, if desired, may contain additional moisture or grape juice by terminating the process of filtering or pressing prior to the maximum extraction of grape juice. This pomace cake contains a valuable quantity of protein, nitrogen free extract, sugars, carbo-hydrates, etc., as well as pectin in sufficient quantity to permit the utilization of the same in the manufacture of jams, butters, etc.

To this pomace cake a suitable quantity of sugar and water may be added and the composite mass heated or cooked sufficiently to effect a proper and adequate combination of the elements and preserve the composite material.

Preferably, however, to this pomace cake is added sugar and composite grape material, including pulp and juice, or juice without the pulp, or other fruit juices, or composite material of other fruits comprising pulp and juice, together with spices, etc., if desired. Any suitable fruit in such degree of ripeness as desired may be pulped and added to the pomace above mentioned. The elements so combined are preferably heated or cooked sufficient to effect a homogeneous combination and preserve the product.

Under certain conditions, and for particular purposes, it may be desirable at times to add commercial pectin to any or all of the composite bodies above named in the production of the products herein, although, for most purposes, I do not contemplate the use of pectin independent of the particular elements constituting the compounds.

Although I have described a specific method of producing the pomace in the manufacture of grape juice as particularly adapted for production of a pomace suitable for the purposes herein, I do not desire to limit myself to the use of such method of producing the pomace except where specifically set forth in the claims hereto appended, as certain aspects of the invention are broader than the detail steps involved in the production of the pomace and may utilize pomace produced in any suitable way and with any desired moisture content in the production of valuable food products within the scope of this invention as set forth in the appended claims.

What I claim is:—

1. The method of manufacturing a grape product consisting in separating juice from the pulp, and adding composite grape material including pulp and juice to said pulp.

2. The method of manufacturing a grape product consisting in separating juice from the pulp, adding composite grape material including pulp and juice to said pulp, and then heating the compounded material.

3. The method of manufacturing a grape product consisting in separating juice from the pulp, and adding sugar and composite grape material including pulp and juice to said pulp.

4. The method of manufacturing a grape product consisting in separating juice from the pulp, adding sugar and composite grape material including pulp and juice to said pulp, and then heating the compounded material.

5. The method of manufacturing a food product consisting in separating grape pomace from the juice, adding to said pomace fruit material, and heating the compounded substances to effect the proper combination.

6. The method of manufacturing a food product consisting in separating grape pomace from the juice, adding to said pomace sugar and fruit material, and heating the compounded substances to effect the proper combination.

7. The method of manufacturing a food product consisting in separating pomace from the juice, adding to said pomace sugar and water, and forming said substances into a homogeneous body.

8. The method of manufacturing a grape product comprising the formation of a composite body of grape material, the crystallization of the argol in definite crystals throughout said composite body, the separation of the pulp of the composite body from the juice, and adding sugar and water to the pulp.

9. The method of manufacturing a grape product comprising the formation of a composite body of grape material, the crystallization of the argol in definite crystals throughout said composite body, the separation of the pulp of the composite body from the juice, adding sugar and water to the pulp, and heating the compounded substances to effect a homogeneous combination.

10. The method of manufacturing a grape product comprising the formation of a composite body of grape material, the crystallization of the argol in definite crystals throughout said composite body, the separation of the pulp of the composite body from the juice, adding composite fruit material including pulp and juice to said pulp, and forming the combined elements into a homogeneous mass.

11. The method of manufacturing a grape product comprising the formation of a composite body of grape material, the crystallization of the argol in definite crystals throughout said composite body, the separation of the pulp of the composite body from the juice, adding fruit juice to said pulp, and forming the combined substances into a homogeneous mass.

12. The method of manufacturing a grape product comprising the formation of a composite body of grape material, the crystallization of the argol in definite crystals throughout said composite body, the separation of the pulp of the composite body from the juice, adding sugar and composite fruit material including pulp and juice to said pulp, and forming the combined elements into a homogeneous mass.

13. The method of manufacturing a grape product comprising the formation of a composite body of grape material, the crystallization of the argol in definite crystals throughout said composite body, the separation of the pulp of the composite body from the juice, adding sugar and fruit juice to said pulp, and forming the combined substances into a homogeneous mass.

14. The method of manufacturing a grape product comprising the formation of a composite body of grape material, the crystallization of the argol in definite crystals throughout said composite body, the separation of the pulp of the composite body from the juice, adding to the pulp fruit material and sugar, and heating the combined elements to effect the combination of the same.

15. The method of manufacturing a grape product comprising the formation of a composite body of grape material by separating the stems, seeds and skins from the rest of the grape material constituting such composite body, storing the composite body until the argol forms in definite crystals throughout such body, separating the argol from the composite body, adding sugar to the composite body and cooking the composite body and sugar until the desired condition is reached.

16. The method of manufacturing a grape product comprising the formation of a composite body of grape material by separating the stems, seeds and fibrous portion of the skins from the rest of the grape material constituting such composite body, heating the composite body, storing the composite body until the argol forms in definite crystals throughout such body, separating the argol from such body, separating a portion of the juice from the composite body, adding sugar to the combined pulp and juice remaining and cooking the pulp, juice and sugar until the desired consistency is reached.

17. The method of manufacturing a grape product comprising the formation of a composite body of grape material comprising pulp and juice, storing such composite body until the argol forms in definite crystals throughout the same, separating the argol from the composite body, combining pulp and juice of the composite body with sugar and cooking same until the proper consistency is reached.

In witness whereof I have hereunto set my hand this 28 day of Sept., 1917.

PAUL R. WELCH

Witnesses:
WILLIAM P. OAKES,
IVAN DUDLEY.